United States Patent Office 3,525,438
Patented Aug. 25, 1970

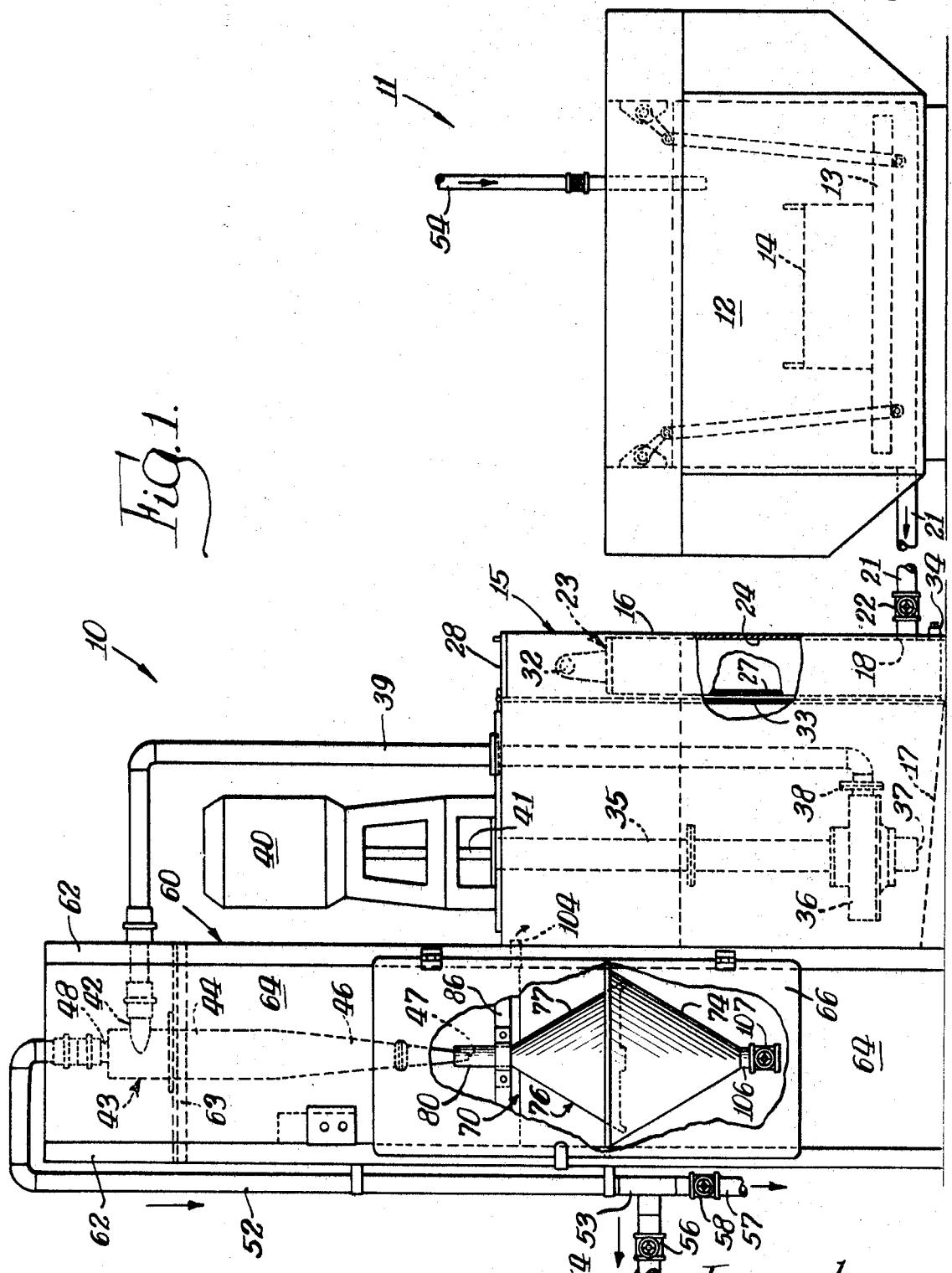

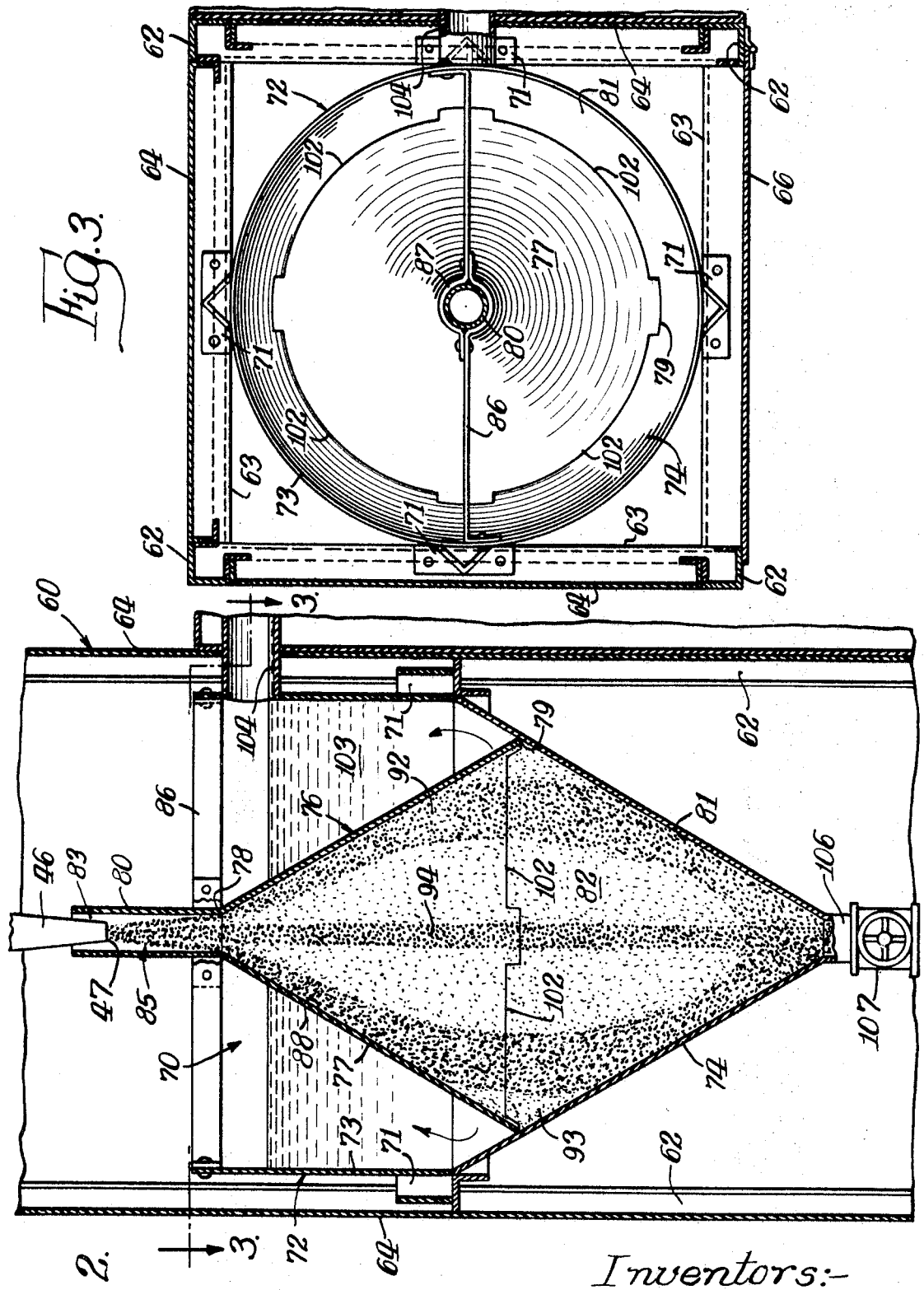

3,525,438
FILTERING SYSTEM
Frank E. Meyers, 1201 Hamilton, Lockport, Ill. 60446, and Florence A. Kostyra, 507 N. Eastern Ave., Joliet, Ill. 60432
Filed Jan. 27, 1969, Ser. No. 794,055
Int. Cl. B04c 5/14; B01d 50/00
U.S. Cl. 210—295           10 Claims

ABSTRACT OF THE DISCLOSURE

A filtering system employing a cyclone separator as a filtering element for separating solid particles in suspension in a fluid to be filtered. An anti-turbulence and particle concentrating means receives the underflow from the separator and serves to further separate solid particles from the fluid in the underflow and provides for recovery of both the solid particles and the fluid of the underflow.

---

This invention relates to filtering systems, and more particularly relates to a filtering system employing a cyclone separator as a filtering element and additional means for effecting separation of particles from the underflow fluid of the separator.

Cyclone separators, sometimes merely referred to as cyclones for brevity, have been employed for various purposes, such as classification and sizing of particles, removal of grit or other particles in suspension in a liquid, as a classification device, and in closed circuit grinding operations. The use of cyclone separators in the foregoing applications, as well as many others, is due in part to their high efficiency, versatility and compactness for the volume of fluid handled. While the ability of cyclone separators to rapidly and accurately separate fine solids from a fluid suspension is well known, these devices have not found general favor in industrial cleaning and polishing operations as a means for separating impurities from the cleaning or polishing solution. Some of the reasons for this are that, in addition to containing most of the solids desired to be separated from the solution being cleaned, the underflow from the cyclone also contains a substantial quantity of the solution sought to be reclaimed. Consequently, unless large settling beds or some other type of auxiliary filtering equipment are employed to recover the solution from the underflow, which is usually discarded, substantial expense will be incurred in replacing the solution lost in the underflow. In addition, if auxiliary filtering equipment or large settling beds are employed to recover the solution in the underflow, the overall size of the system, as well as its cost, are substantially increased. Consequently, the high flow volume, compact size and low cost advantages of a filtering system utilizing one or more cyclone separators is lost.

Accordingly, it is the general object of the present invention to provide a novel filtering system employing a cyclone separator to effect separation of particles suspended in a solution to be filtered, which overcomes the aforementioned objections and disadvantages.

Another object is to provide a novel filtering system of the foregoing character which is more efficient, substantially smaller, and less costly than comparable systems.

A further object is to provide a novel filtering system for industrial filtering operations, which does not require large settling tanks or mineral beds, and which eliminates the need for servicing and/or replacement of filter membranes and liners.

A more particular object is to provide a novel filtering system employing a cyclone separator as a filtering element for separating solid particles in fluid suspension, which system includes novel means for effecting separation of the particles from the fluid in the underflow from the cyclone.

A specific object is to provide a novel particle concentrating means capable of rapidly and efficiently separating solid particles from the underflow of a cyclone separator.

Other objects and advantages will become apparent from the following description and accompanying sheets of drawings, wherein:

FIG. 1 is a side elevational view, with portions thereof broken away to show underlying parts, of a filtering system embodying the features of the present invention and showing the system associated with an exemplary device of the type with which it is adapted for use;

FIG. 2 is an enlarged, longitudinal sectional view through a portion of the filtering system illustrated in FIG. 1, and showing the distribution of solid particles in the portion when the system is in operation; and FIG. 3 is a sectional view taken along the view 3—3 of FIG. 2.

Briefly described, the present invention contemplates a novel filtering system employing a cyclone separator as a filtering element for separating solid particles in suspension in a fluid. The fluid containing the particles in suspension is supplied to the feed inlet of the cyclone separator and substantially particle free fluid is discharged from the overflow outlet of the separator for delivery to a point of use. The underflow from the cyclone separator, which contains a substantial quantity of the fluid, is directed to a particle concentrating means instead of being discarded to a drain.

The particle concentrating means, to be hereinafter described in detail, comprises a receptacle having turbulence reducing means mounted therein. The turbulence reducing means is generally of an inverted funnel-shape and includes a frustoconically-shaped portion and an upwardly extending tubular, cylindrical portion for receiving the underflow and channeling it into the upper, smaller end of the frustoconically-shaped portion. The frustoconically-shaped portion serves to rapidly decelerate the particles in suspension in the underflow and thus cause them to settle out of suspension toward the bottom of the receptacle. The lower portion of the receptacle is also preferably conically shaped, and this portion of the receptacle and the frustoconically-shaped portion of the turbulence reducing means define a chamber therebetween. A series of recesses are provided in the lower, larger end of the frustoconically-shaped portion and serve to permit fluid of substantially reduced particle concentration to flow from the chamber into another chamber above the turbulence reducing means. A drain outlet is provided at the lower end of the receptacle, which is periodically opened to remove accumulated particles.

Fluid of reduced particle concentration is discharged from the upper chamber of the particle concentrating means into a reservoir which also receives fluid containing particles in suspension from the main source thereof. A pump is mounted in the reservoir for producing flow through the system and conduit means interconnects the outlet of the pump with the feed inlet of the cyclone separator. The feed inlet of the cyclone separator thus receives recirculated fluid of reduced particle concentration from the particle concentrating means as well as fluid of high particle concentration from the main source thereof.

The filtering system also includes coarse filtering means in the form of a removable filtering basket and a fixed filtering screen, arranged in series, and mounted in the reservoir upstream from the pump inlet.

In FIG. 1, a filtering system indicated generally at 10 and embodying the features of the present invention, is illustrated. While the filtering system 10 is adapted for use in many and varied applications, it will hereinafter be described in connection with one exemplary device, such as an industrial parts cleaning machine indicated generally at 11 in FIG. 1.

The machine 11, which forms no part of the present invention, includes a cleaning reservoir or tank 12 having a reciprocable platform 13 mounted therein. The platform 13 serves to support larger parts or a basket 14 in which smaller parts to be cleaned are placed. The tank 12 is filled with an appropriate cleaning solution and the part or parts are cleaned by reciprocating the platform 13 in the cleaning solution for a given period of time to remove grease, small pieces of metal, dirt and other impurities. Larger impurities gravitate to the bottom of the tank 12 while the smaller impurities or particles go into suspension in the cleaning solution.

Assuming that the cleaning solution in the tank 12 has reached a level of contamination such that the solution is no longer acceptable for use, the filtering system 10 may be connected to the tank 12, or to some other vessel containing the contaminated solution, to remove the suspended particles therefrom and thus restore the solution to usefulness. The filtering system 10 thus comprises a reservoir 15 that is adapted to be connected to and receive fluid to be filtered from a source thereof such as the cleaning tank 12 of the machine 11. The reservoir 15 in the present instance, comprises a tank having upstanding side walls, one of which is indicated at 16, and a bottom wall 17 which is inclined toward an inlet opening 18 in the wall 16. One end of a pipe 21 is shown connected to the inlet opening 18 and the other end of the pipe 21 is connected to the source of fluid to be filtered, such as the tank 12 of the machine 11. A valve 22 may be provided in the pipe 21 to control flow therethrough.

A removable, box-like filtering basket 23 is mounted in the reservoir 17 adjacent the wall 16, for receiving and trapping large particles entering the reservoir 15 through the inlet 18. To this end, the outer or side wall 24 of the basket 23 is provided with an opening, not shown, which registers with the inlet opening 18 in the side wall 16 of the reservoir when the basket is in the position shown in FIG. 1. Fluid to be cleaned may thus flow into the interior of the basket 23 for passage through a coarse mesh screen 27 comprising the inner side wall of the basket 23. A hinged door 28 is provided at the top of the reservoir 15 to permit removal of the basket 23 from the reservoir and emptying of the contents thereof. A handle 32 secured to the upper end of the basket facilitates installation and removal thereof from the reservoir.

Another coarse mesh screen 33 is permanently mounted in the reservoir 15 in spaced relation from the outer wall 16 thereof to prevent large particles or pieces of material from entering the central portion of the reservoir 15 in the event that the filtering system 10 is operated without the filtering basket 23 in place. A drain plug 34 is provided in the side wall 16 adjacent the bottom wall 17 of the reservoir to permit removal of sediment and other materials that may not have been trapped in the removable basket 23.

A pump 36 having an inlet 37 and an outlet 38 is mounted in the reservoir 15 and supported therein in close proximity to the bottom wall 17 by a tubular support member 35. A motor 40 is mounted on the top of the reservoir 15 and has a shaft 41 drivingly connected to the pump 36 through the tubular support member 35.

The pump outlet 38 is connected by means of a series of pipes 39 with the feed inlet, indicated at 42, of a cyclone separator 43. Such devices are sometimes merely referred to as cyclones. The connected series of pipes 39 thus comprise first conduit means for connecting the feed inlet 42 of the cyclone 43 with a source of fluid to be filtered and containing particles in suspension, such as the reservoir 15 and cleaning tank 12 of the machine 11.

The cyclone separator 43 may be of any type suitable for handling the solutions and materials to be filtered by the system 10. One type of cyclone suitable for use in the filtering system 10 is manufactured and sold by Krebs Engineers, Palo Alto, Calif. The cyclone separator 43 thus comprises an elongated tubular body having an upper cylindrical portion 44 and a lower conical portion 46. The feed inlet 43 extends tangentially from the cylindrical portion 44 adjacent the upper end thereof. The lower conical portion 46 terminates in an opening comprising an underflow outlet 47 for the cyclone. An overflow outlet 48 is provided in the upper end of the cylindrical portion 44, and a series of connected pipes, indicated at 52, direct the overflow from the separator to a junction or manifold 53. From the manifold 53, the overflow, which comprises fluid that is substantially free of particles or solid impurities, may be directed to a point of use, such as the cleaning tank 12 of the washing machine 11. A series of connected pipes 54, having a valve 56 therein conducts the overflow to the desired point of use. Another pipe 57 may be connected to the manifold 53 to permit the overflow conduit 52 to be drained when the system 10 is inoperative or is to be used with a solution incompatible with that being filtered. The drain flow may be controlled by a valve 58.

The cyclone 43 is mounted in an elevated position with respect to the reservoir 15 on a support structure, indicated generally at 60. The support structure 60, in the present instance, comprises a plurality of spaced uprights 62 interconnected by horizontally extending, angle bars 63 at various points. The area between the uprights 62 may be closed by sheet metal panels 64, if desired, and a door 66 may be hinged to one side of the support structure 60 to permit access to the interior thereof and the upper parts of the system.

With the foregoing construction, it will be apparent that fluid containing solid particles in suspension, such as would be present in the cleaning solution in the tank 12 after the machine 11 has been in operation for sometime, will be drawn into the reservoir 15 of the filtering system 10 when the pump 36 is operating. Larger particles in the fluid will be trapped in the removable filter basket 23 and/or by the permanent screen 33. After passage through the screens 27 and 33, fluid containing solid particles in suspension will be drawn into the inlet of the pump 37 and supplied under pressure through the conduit 39 to the tangential feed inlet 42 of the cyclone separator 43. After entry into the cyclone separator 43, the flow of fluid is transformed into a vortex in a manner well known in the operation of cyclone separators. Heavier particles in the vortex are thus caused to move radially outwardly in the flow toward the inner surface of the cylindrical and conical portions 44 and 46 for eventual discharge through the underflow outlet 47 of the cyclone. At the same time, another flow of fluid that is substantially free of particles is discharged through the overflow outlet 48 to the conduit 52. Such particle free fluid may then be directed by the pipe 54 to a point of use, such as the tank 12 of the cleaning machine 11, as heretofore described.

While most of the fluid supplied to feed inlet 42 is discharged through the overflow outlet 48, a substantial quantity of the fluid is also discharged from the underflow outlet 47 along with the particles separated from overflow. Consequently, if the underflow is discharged into a sewer or other point of disposal, as is frequently done in other systems, the fluid present in the underflow is lost. Such loss, of course, results in increased expense of operation as well as other disadvantages.

While various methods of recovery of fluid from the underflow from a cyclone separator have been utilized, such as large settling tanks or the like, such arrangements are unsatisfactory from the standpoint of requiring a large volume of fluid in the system and consequently an increased overall size of the system. In addition, the cost of the system is substantially increased.

To overcome the foregoing disadvantages and to improve the efficiency of the filtering system 10, the latter includes novel particle concentrating means, indicated generally at 70, for effecting separation of the particles suspended in the underflow from the underflow outlet 47 of the cyclone separator 43 and for accumulating such particles for subsequent removal from the system so that fluid of substantially reduced particle concentration may be returned to the reservoir 15 for recirculation through the cyclone separator 43.

Referring now to FIGS. 2 and 3 in conjunction with FIG. 1, the particle concentrating means 70 comprises a receptacle or tank 72 having an upper cylindrical portion 73 and a lower conical portion or hopper 74. The tank 72 is supported on the support structure 60 by a plurality of equidistantly spaced brackets 71 secured to the side wall of the tank and fastened to angle support bars extending between the uprights 62. Mounted in the tank 72 is a turbulence reducing means substantially in the form of inverted, funnel-shaped member 76. The member 76 is tubular and includes a frustoconically-shaped portion 77 having an upper, smaller end 78 and a lower, larger end 79. A cylindrical portion 80 extends upwardly from the smaller end 78 of the portion 77. The diameter of the larger or lower end 79 of the frustoconically-shaped portion 77 is somewhat smaller than the inside diameter of the cylindrical portion 73 of the tank 72 so that the lower end 79 of the portion 77 rests on the inner surface, indicated at 81, of the conical portion 74 of the tank 72.

The conical angle of the frustoconically-shaped portion 77 is preferably about 60° plus or minus about 30°. The aforementioned conical angle is the included angle defined between the lines of intersection on the inner surface 88 of the frustocoically-shaped portion 77 by a plane through the axis of the portion 77. The conical angle of the lower portion 74 of the tank 72 is preferably of the same conical angle as the portion 77. Thus, when the lower end 79 of the tubular member 76 is resting on the inner surface 81 of the conical portion 74 of the tank 72, the portions 77 and 74 together define a turbulence reducing and particle accumulating chamber 82, the purpose and function of which will be explained presently.

As heretofore mentioned, the funnel-shaped member 76 includes a cylindrical portion 80 extending upwardly from the smaller end of the frustoconically-shaped portion 77. Such cylindrical portion 80 is preferably of a length and diameter such as to receive a portion of the lower end of the cyclone separator 43 while maintaining a gap 83 therebetween. The cylindrical portion 80 thus serves to channel the underflow, indicated at 85, from the outlet 47, into the interior of the member 76 and to reduce aeration of the underflow.

Minimizing aeration of the underflow is advantageous to the operation of the particle concentrating means 70 in that "floaters" are thereby eliminated or substantially reduced. "Floaters" are small particles to which an air bubble has adhered. Such minimization of aeration is achieved by reducing the size of the gap 83 to a value such as will just prevent generation of a vacuum at the gap 83 and/or adversely effect the operation of cyclone separator 43.

The cylindrical portion 80 also provides a convenient point for supporting the member 76 in the receptacle 73, such support being provided by a strap 86 having its outer ends secured to the inner surface of the cylindrical portion 73 of the tank 72. A semicircular bracket 87 coacts with a similarly-shaped central portion of the strap 86 to embrace and secure the member 76 in its mounted position in the receptacle 72.

With the foregoing construction and assuming a delivery rate from the pump 36 sufficient to operate the cyclone separator 43, the underflow 85 discharging from the underflow outlet 47 will initially contact the inner surface of the tubular portion 80 and then be directed thereby into the upper or smaller end 78 of the frustoconically-shaped portion 77. Upon entry into the frustoconically-shaped portion 77, most of the heavier particles in the underflow 85 will move radially outwardly and engage the inner surface, indicated at 88, of the frustoconically-shaped portion 77. Such surface acts as a friction means and serves to rapidly decelerate these particles as well as to eliminate their voretical movement. In other words, the surface 88 rapidly eliminates turbulence in the underflow and converts it to a quiescent state. Experiments have shown that the surface provided by sheet black iron is of sufficient roughness to provide the desired flow retarding effect. However, the degree of roughness of the surface 88 may be varied in accordance with different operating conditions and fluids being filtered.

After the particles enter a quiescent state, they settle toward the lower portion 74 of the tank 72 and eventually concentrate at the bottom thereof. The paths of movement of the heavy particles through the chamber 82 are illustrated in FIG. 2 and includes a path 92 that is generally in the form of a hollow ellipsoid. The outer periphery of the path 92 follows the wall of the frustoconically-shaped portion 77 until it reaches a point somewhat above the lower end 79 of the portion 77. At this point, the path separates from the surface 88. The outer periphery of the path 92 remains separated from the wall of the chamber 82 for a short distance and then rejoins the wall of the chamber at a point somewhat below the lower end 79 of the portion 77. The periphery of the path 92 then follows the inner surface 81 of the lower portion 74 of the tank 72 to the bottom thereof.

An annular zone 93 is thus defined between the walls of the chamber 82 and the outer periphery of the path 92 where the path has separated from the chamber wall. Such zone 93 contains fluid that is substantially free of particles.

In addition to the path 92, a small diameter column 94 of heavy particles also extends through the center of the chamber 82 coextensive with the axis thereof.

The lower conical portion 74 of the chamber 82 coacts with the particles in the path 92 to cause these particles to conglomerate as they move toward and accumulate at the bottom of the portion 74.

The frustoconically-shaped portion 77 and/or the conical portion 74 of the tank 72 are sized and shaped so that the volume of the chamber 82 will require a period of not less than about 15 minutes before the quantity of underflow 85 supplied to the chamber equals the volume thereof. In other words, when the filtering system 10 is in operation and the chamber 82 is completely filled, particles entering the upper end of the chamber 82 will have a period about 15 minutes to settle out of the fluid, or more.

In order to provide for movement of fluid in the annular zone 93 out of the chamber 82, at least one and preferably a plurality of recesses 102 are provided in the lower end 79 of the frustoconically-shaped portion 77. Such recesses define passages or ports which permit the fluid in the zone 93 to flow upwardly to a receiving chamber 103 defined between the inner wall of the upper cylindrical portion 73 of the tank 72 and the outer surface of the frustoconically-shaped portion 77 of the member 76. When the fluid in the chamber 103 reaches a certain level, it overflows through as pill conduit 104 near the top of the chamber 103 into the reservoir 15 for recirculation through the cyclone separator 43.

As the system 10 is operated, solid particles separated from the underflow 85 supplied to the chamber 82 will accumulate at the bottom of a lower conical portion 74. In order to permit removal of such accumulated particles, a pipe 106 is connected to the lower or apex end of the conical portion 74, and a valve 107 is provided for controlling flow through the pipe 106.

It will thus be apparent that the particle concentrating means 70 substantially increases the efficiency and economy of operation of the filtering system 10 in that it provides for recovery of both constituents of the underflow 85. Thus, the fluid portion of the underflow being returned to the reservoir 15 for recirculation through the cyclone 43 and subsequent return to a point of use, such as the cleaning tank 12 of the machine 11, and the accumulated particles in the lower end of the conical portion 74 of the receptacle 72, may be discharged into a suitable vessele for further treatment. The latter capability of the particle concentrating means 70, in certain applications of the filtering system 10, may be of greater importance than the recovery of the fluid portion of the underflow 85.

Throughout the specification, the term "fluid" has been used to describe one of the constituents supplied to the reservoir 15 and cyclone separator 43 of the filtering system 10. It will be understood that the term "fluid" includes both liquids and gases, although the filtering system 10 is best suited for operation with fluids in the liquid phase.

While only one embodiment of the invention has been herein illustrated and described, it will be understood that modifications and variations thereof may be effected without departing from the scope of the invention as set forth in the appended claims.

We claim:

1. A filtering system for separating particles suspended in a fluid, comprising a cyclone separator having a feed inlet, an overflow outlet and an underflow outlet, first conduit means connected at one end to said cyclone inlet and having its other end adapted to communicate with a source of fluid to be filtered and containing particles in suspension, second conduit means connected at one end to said cyclone overflow outlet and having its other end adapted to be connected to a point of use, pump means connected with said first conduit means for producing flow through said system, and particle concentrating means positioned bleow the underflow outlet to receive the swirling underflow from the underflow outlet of said cyclone separator and having an outlet connected with the source of fluid to be filtered for discharging fluid of reduced particle concentration therefrom and conducting it to said source, said particle concentrating means including a turbulence reducing portion operable to rapidly decelerate said swirling underflow, an accumulator portion operable to receive and retain particles separated from said underflow and means for removing said retained particles from said accumulator portion, said turbulence reducing portion including a tubular frustoconically-shaped portion inverted so that the swirling underflow enters the upper, smaller end thereof, said frustoconically-shaped portion having an inner surface to be engaged by the swirling underflow, said inner surface comprising friction means causing the rapid deceleration of the underflow and said particles.

2. The filtering system of claim 1, wherein said particle concentrating means outlet and said other end of said first conduit means are connected to a common reservoir, and said reservoir has an inlet connected to said source of fluid containing particles in suspension and an outlet connected with said other end of said first conduit means.

3. The filtering system of claim 2 wherein a filtering screen is provided in said reservoir between the pump inlet and the reservoir inlet and a removable filtering basket is provided in said reservoir between said filtering screen and said reservoir inlet.

4. The particle concentrating means of claim 1, wherein the included conical angle of said frustoconically-shaped portion is about 60° plus or minus about 30°.

5. The particle concentrating means of claim 1, wherein the accumulator portion comprises a receptacle and the lower portion of said receptacle is conically shaped and arranged with the apex thereof disposed downwardly, and the larger end of the frustoconically-shaped portion engages the inner surface of the lower portion of said receptacle, the frustoconically-shaped portion of said turbulence reducing means and the inner surface of the conical lower portion of said receptacle defining a turbulence reducing and particle accumulating chamber.

6. The particle concentrating means of claim 5, wherein said receptacle has an upper portion extending above the larger end of the frustoconically-shaped portion of said turbulence reducing means, said upper portion of said receptacle and the outer surface of said frustoconically-shaped portion defining a receiving chamber therebetween, and at least one recess is provided in the edge of said larger end of said frustoconically-shaped portion to permit fluid of reduced particle concentration to flow from said particle concentrating and accumulating chamber to said receiving chamber.

7. The particle concentrating means of claim 6, wherein a plurality of circumferentially extending recesses are provided in the edge of the larger end of said frustoconically-shaped portion.

8. The particle concentrating means of claim 6, wherein the volume of said particle concentrating and accumulating chamber is such as to provide a period of not less than about 15 minutes before the quantity of fluid supplied thereto equals its volume.

9. The particle concentrating means of claim 1, wherein said turbulence reducing portion includes a tubular cylindrical portion extending upwardly from the smaller end of said frustoconically-shaped portion, said tubular cylindrical portion receiving therein the underflow outlet and the swirling underflow from said underflow outlet to channel such underflow into said frustoconically-shaped portion.

10. The particle concentrating means of claim 9, wherein a gap is adapted to be provided between said cylindrical portion and the underflow outlet of said cyclone separator.

References Cited

UNITED STATES PATENTS

| 973,357 | 10/1910 | Lewis et al. | 210—534 X |
|---|---|---|---|
| 3,235,090 | 2/1966 | Bose et al. | 210—512 |
| 3,433,361 | 3/1969 | Ades | 210—298 X |

J. L. DE CESARE, Primary Examiner

U.S. Cl. X.R.

210—512, 534